Nov. 18, 1930. F. M. ELLIOTT 1,782,293
SNAP FASTENER STUD
Filed March 28, 1930
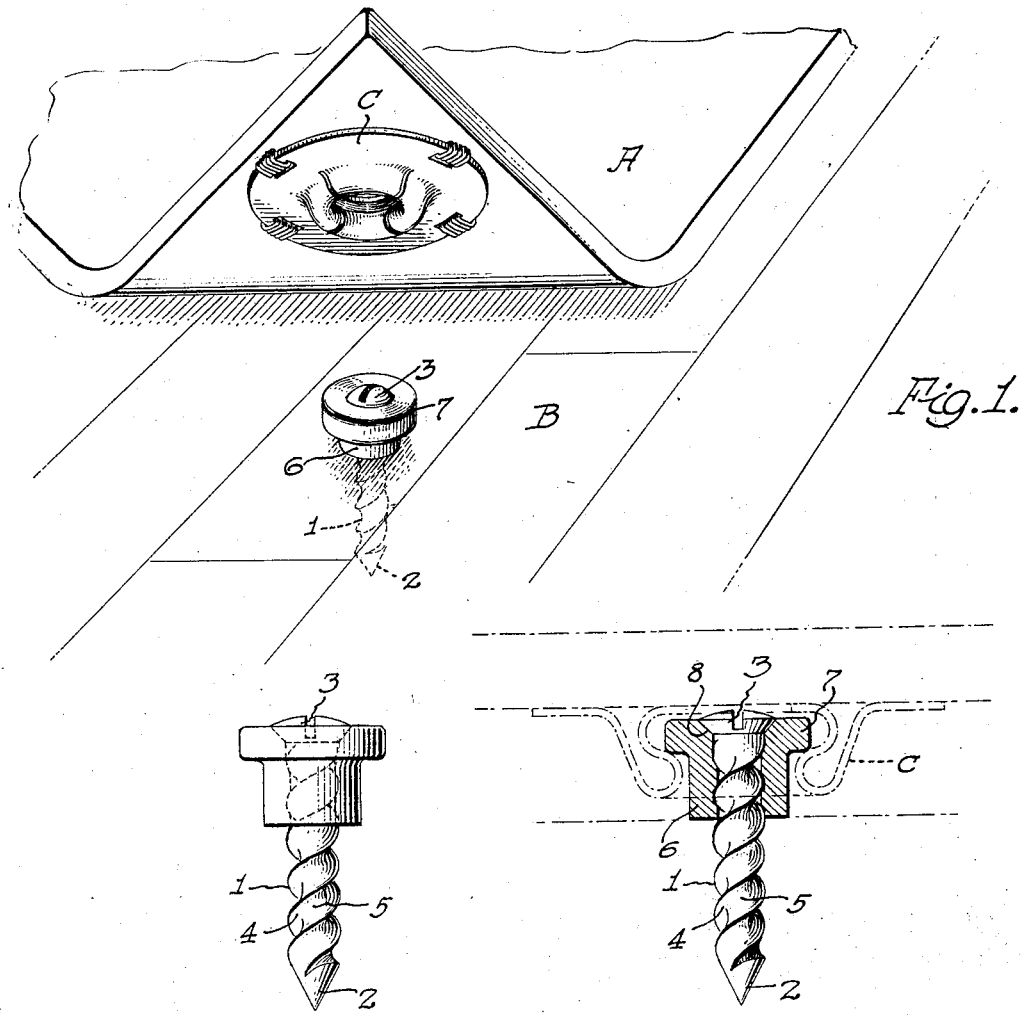
Fig.1.
Fig.2. Fig.3.
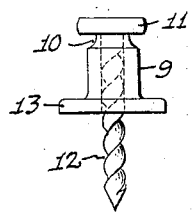
Fig.4.
INVENTOR
Frank M. Elliott,
BY
ATTORNEYS Patented Nov. 18, 1930

1,782,293

UNITED STATES PATENT OFFICE

FRANK M. ELLIOTT, OF DETROIT, MICHIGAN

SNAP-FASTENER STUD

Application filed March 28, 1930. Serial No. 439,621.

This invention relates to that class of devices known as snap fasteners, and more particularly to a stud serving as one member of a snap fastener which is especially adapted for holding rugs, carpets and other articles in place upon floors or other parts to which it is desired to detachably secure such articles.

An object of the invention is to provide a stud for the purpose which is cheap to manufacture, quickly installed, and is especially designed for use in connection with a drive screw, said screw forming a part of the stud after assembly, said screw being driven through an outer part or sleeve of the stud, said part or sleeve serving as a guide and reinforcement for the screw to prevent bending of the screw shank when it is driven in, thus permitting the use of a screw shank of small diameter, said sleeve at the same time serving as a stop to limit the depth to which said screw may be driven in, and also serving in certain constructions, to space from the floor surface, a head formed on said sleeve to engage within the snap button or socket member which is secured to the under side of the rug or other article to be detachably held in place by the fastener.

With the above and other ends in view, the invention consists in the matters hereinafter set forth and more particularly pointed out in the appended claims, reference being had to the accompanying drawing in which—

Figure 1 is a perspective view illustrative of the device in use;

Fig. 2 is a side elevation of a stud illustrative of an embodiment of the present invention;

Fig. 3 is a longitudinal section through Figure 2; and

Fig. 4 is a side elevation showing a modified construction.

Snap fasteners of this character are most commonly employed, as illustrated in Figure 1, to detachably hold a carpet or rug A in place upon a floor B, but it will be understood that the same may be used for other purposes, and such fasteners comprise a snap button or socket member C constructed in any suitable manner so that it may be quickly and easily secured to the under side of the rug and to receive a head on a stud to be driven into the floor B, said socket or head or both being constructed to yield so that the head may be entered into the socket to detachably hold the rug down upon the floor. In placing these studs as commonly constructed, care must be exercised not to drive the stud in too far as otherwise the socket member C will not properly engage therewith, and the stud is very liable to be distorted or the shank thereof bent so that its head will not enter the socket.

The present invention relates to the construction of a stud adapted for use with any suitable yieldable socket member C to snap over and be detachably engaged with a head on the stud, and this stud comprises, as shown in enlarged detail in Figures 2 and 3, a drive screw 1 of the usual construction having a sharp point 2 at its lower end, a slotted head 3 at its upper end, and a screwthread 4 on its body or shank portion 5, which thread is deep and of a long pitch so as to permit the screw to be driven into the wood. The use of such a screw greatly facilitates the placing of the stud, and to provide a head therefor, suitable for engagement with the socket member C, a sleeve member 6 for the screw, is provided with a head 7, said head and sleeve being preferably formed from a suitable soft metal blank formed up in any suitable manner to provide said sleeve portion with said head integral with the upper end thereof. When so formed, the sleeve has an internal bore of lesser diameter than the external diameter of the screw body so that in assembling the sleeve member and drive screw, the screw may be driven through the sleeve, the screwthread cutting into the soft metal of the sleeve and thus firmly attaching the sleeve to the screw.

In placing the stud with the sleeve assembled thereon, the screw is simply driven into the floor, thus facilitating the securing of the stud in place, and the head 7 to engage within the socket member C is accurately spaced from the surface of the floor B by said sleeve, its length determining such spacing. The sleeve also forms a guide and reinforcement for the screw while it is being driven in, preventing bending of the screw shank and holding it at right angles to the floor surface so that the end portion driven into the floor will always be properly engaged therein, and if desired, a recess 8 may be provided in the upper side of the head 7 to receive the head 3 of the screw so that the screw head will be properly seated on the head of the sleeve, substantially flush with the upper surface thereof.

A proper spacing of the head 7 from the floor is therefore insured so that the socket member C will always be properly engaged therewith, and said sleeve provides a neck portion of smooth exterior for the stud. This neck or sleeve portion because of its firm seat at its lower end upon the floor surface, also supports and reinforces the screw against side strains imposed thereon by the rug or other article held by the fastener and a head 7 of any desired diameter to fit the socket C may be provided. The use of a drive screw in devices of this character greatly facilitates the installation and a stud which is very efficient in operation and cheap to manufacture is provided by the employment of the headed sleeve on this screw.

Where a head of comparatively small diameter is desirable to co-operate with the socket member, the construction shown in Fig. 4 may be preferable, wherein the sleeve 9 may be of less diameter and cut away at its upper end to form an annular groove 10 directly beneath the head 11 of the screw, which head may be of greater diameter in proportion to the screw shank 12. This groove 10 is thus provided to receive the spring prongs or other engaging parts of the socket member which will thus engage directly beneath the screw head. As shown, the sleeve may be provided with a head or flange 13 at its lower end to seat upon the floor where the screw is driven in, and thus form a support to hold the sleeve in an upright position, strengthen the sleeve, and prevent bending of the screw shank which may, therefore, be of reduced diameter.

In certain instances however, as where the sleeve is of a diameter to give sufficient strength and bearing at its lower end upon the floor, the flange 13 may be omitted.

Obviously other changes may be made in the construction and proportion of the parts, within the scope of the appended claims, without departing from the spirit of the invention and such changes are contemplated.

Having thus fully described my invention, what I claim is:—

1. A stud for snap fasteners including a drive screw having a screwthread upon the shank portion thereof, a sleeve member formed of soft metal through which sleeve said drive screw is driven to cause said screw thread to cut into the soft metal of the sleeve and rigidly secure said sleeve and screw together, and a head on said sleeve member for separable snapping engagement with a socket member.

2. A snap fastener stud comprising a drive screw having a shank provided with a screw-thread of extended pitch and a head on one end and pointed at its opposite end, and a member formed of soft metal with a tubular portion forming a sleeve through which said shank is forced with said thread cutting into the soft metal of said sleeve and with said screw head firmly seated upon one end of said sleeve with the pointed end portion of said shank projecting beyond the opposite end of said sleeve, and with the end of said sleeve beyond which said shank extends, forming a seat to support said shank when said stud is applied in use.

3. A stud for snap fasteners including a drive screw, and a member formed of soft metal having a sleeve portion provided with a head at one end to engage within a socket member of a snap fastener and through which sleeve said drive screw is driven with its thread cutting into said sleeve to secure said member and screw together.

4. A snap fastener stud comprising a drive screw having a shank provided with a screw thread of extended pitch, and a tubular member formed of soft metal with a bore of less diameter than the external diameter of the screw thread on said shank, said member being of less length than the length of said shank and formed with a head at one end.

5. A snap fastener stud comprising a drive screw having a body provided with a screw-thread of extended pitch and a head on one end and pointed at its opposite end, and a member having a tubular portion forming a sleeve for said screw and a head integral with one end of said sleeve to engage within a socket member of the fastener, said head being formed with a seat for the head of said screw at the end of the bore of said sleeve opening through said head, said bore being of lesser diameter than the external diameter of the said body of said screw.

In testimony whereof I affix my signature.

FRANK M. ELLIOTT.